(12) United States Patent
Gallucci et al.

(10) Patent No.: US 8,546,516 B2
(45) Date of Patent: Oct. 1, 2013

(54) TRANSPARENT POLYIMIDE-POLYESTER COMPOSITIONS, METHOD OF MANUFACTURE, AND ARTICLES THEREOF

(75) Inventors: Robert R. Gallucci, Mt. Vernon, IN (US); Mark A. Sanner, Newburgh, IN (US)

(73) Assignee: Sabic Innovative Plastics IP B.V. (NL)

( * ) Notice: Subject to any disclaimer, the term of this patent is extended or adjusted under 35 U.S.C. 154(b) by 0 days.

(21) Appl. No.: 12/815,754

(22) Filed: Jun. 15, 2010

(65) Prior Publication Data

US 2011/0303577 A1 Dec. 15, 2011

(51) Int. Cl.
*C08G 63/127* (2006.01)
(52) U.S. Cl.
USPC ......... 528/308.1; 528/310; 528/315; 528/322
(58) Field of Classification Search
USPC ............... 528/308.1, 310, 315, 322
See application file for complete search history.

(56) References Cited

U.S. PATENT DOCUMENTS

| | | | |
|---|---|---|---|
| 4,141,927 A | 2/1979 | White et al. | |
| 4,820,795 A * | 4/1989 | Hirata et al. | 528/272 |
| 5,284,903 A | 2/1994 | Minnick | |
| 5,439,987 A | 8/1995 | Scott et al. | |
| 6,063,874 A | 5/2000 | Jin et al. | |
| 6,753,365 B2 * | 6/2004 | Brown et al. | 524/123 |
| 2002/0167111 A1 | 11/2002 | Tsunekawa et al. | |
| 2004/0254331 A1 * | 12/2004 | Minobe et al. | 528/279 |
| 2007/0197700 A1 * | 8/2007 | Gallucci et al. | 524/210 |
| 2009/0181199 A1 * | 7/2009 | Agarwal et al. | 428/36.8 |

OTHER PUBLICATIONS

ASTM D790 Standard Test Methods for Flexural Properties of Unreinforced and Reinforced Plastics and Electrical Insulating Materials, 11 pages, Sep. 2007.
ASTM D1003, Standard Test Method for Haze and Luminous Transmittance of Transparent Plastics, 6 pages, Jun. 2000.
ASTM D1238, Standard Test Method for Melt Flow Rates of Thermoplastics by Extrusion Plastometer, 14 pages, Dec. 2004.
ASTM D638, Standard Test Method for Tensile Properties of Plastics, 15 pages, Dec. 2003.
Guidance for Industry: Preparation of Premarket Submissions for Food Contact Substances: Chemistry Recommendations; U.S. Food and Drug Administration; Apr. 2002; Dec. 2007, 18 pages.
Ganesh Bhat, Jacob L Oberholtzer, Louis R. Nudy, "Migration Studies of BPA from Polyetherimide", Technical Report No: 2009-SABICIP-0103, Sep. 4, 2009, 10 pages.
JP 2001294733 A, Publication date: Oct. 23, 2001, Thomson Abstract XP-002657678, 2 pages.
JP 2005002155 A, Publication date: Jan. 6, 2005, Thomson Abstract XP-002657677, 3 pages.
The International Searching Authority, International Search Report, PCT/US2011/040569, Date of Mailing: Sep. 13, 2011, 5 pages.
The International Searching Authority, Written Opinion, PCT/US2011/040569, Date of Mailing: Sep. 13, 2011, 6 pages.
JP2001294733 English Translation With Letter of Certification; Oct. 23, 2001; 30 pages.
JP2005002155 English Translation With Letter of Certification; Jan. 6, 2005; 25 pages.
International Preliminary Report on Patentability for International Application No. PCT/US2011/040569; International Filing Date Jun. 15, 2011; Date of Issue Dec. 18, 2012; 5 pages.

\* cited by examiner

*Primary Examiner* — Peter Szekely
(74) *Attorney, Agent, or Firm* — Cantor Colburn LLP; Diderico van Eyl

(57) ABSTRACT

A thermoplastic polymer composition comprises a combination of: 40 to 60 pbw, of a polyetherimides, polyetherimide sulfones, or combination thereof having a weight average molecular weight from 5,000 to 80,000 Daltons; 40 to 60 pbw of a polyethylene terephthalate, the polyethylene terephthalate having a diethylene glycol content from 0.1 to 4 wt %, based on the weight of the polyethylene terephthalate, an intrinsic viscosity that is more than 0 and less than 0.83 dl/g, and carboxylic acid end groups in an amount from 10 to 150 meq/Kg; from 0 pbw to 1 pbw, based on 100 pbw of the polymer composition of a stabilizer selected from phenol-containing stabilizers, phosphorus-containing stabilizers, or a combination thereof; and, based on the weight of the polyethylene terephthalate, 10 to 300 antimony; 0 to 300 ppm of cobalt; and 0 to 300 ppm of titanium; wherein the polymer composition is bisphenol A free.

28 Claims, No Drawings

US 8,546,516 B2

TRANSPARENT POLYIMIDE-POLYESTER COMPOSITIONS, METHOD OF MANUFACTURE, AND ARTICLES THEREOF

FIELD OF THE INVENTION

This invention generally relates to transparent compositions containing a blend of polyetherimide and polyethylene terephthalates, methods for the manufacture of the compositions, articles manufactured from the compositions, and methods of manufacturing those articles.

BACKGROUND OF THE INVENTION

Combinations of polyimides and various polyesters useful for the manufacture of transparent articles are generally known. For example, U.S. Pat. No. 4,141,927 discloses a combination of polyetherimide and polyethylene terephthalate; U.S. Pat. No. 5,284,903 discloses a combination of polyetherimide with polycyclohexane-dimethanol terephthalate; and U.S. Pat. No. 5,439,987 discloses a combination of polyetherimide certain poly(cyclohexane-1,4-dimethylene-co-ethylene terephthalate). While these polyetherimide-polyester combinations can be used in molding various articles, color shifts in the articles can result in increased rejection rates. U.S. Pat. No. 6,063,874 discloses a more color-stable combination of polyetherimide-polyester that further contains phosphorus- and/or phenol-containing color stabilizers. Nonetheless, it has been difficult to achieve transparency in polyimide-polyester compositions containing higher levels of polyesters, as such compositions tend to phase separate, as described in U.S. Pat. No. 4,141,927 FIG. 2, leading to haze and opacity. It would be a further benefit if transparent polyimide-polyester compositions could be obtained that retained good melt flow properties, tensile properties, and/or flexural properties. It would be a further advantage if such properties were maintained after exposure to heat and humidity.

BRIEF SUMMARY OF THE INVENTION

In one embodiment, a thermoplastic polymer composition comprises a bisphenol A free combination of: from 40 to 60 pbw, based on 100 pbw of the polymer composition, of a polyimide selected from polyetherimides, polyetherimide sulfones, and combinations thereof, the polyimide having a weight average molecular weight ranging from 5,000 to 80,000 Daltons; from 40 to 60 pbw, based on 100 pbw of the polymer composition, of a polyethylene terephthalate, the polyethylene terephthalate having a diethylene glycol content ranging from 0.1 to 4 wt %, based on the weight of the polyethylene terephthalate, an intrinsic viscosity that is more than 0 and less than 0.83 dl/g, and carboxylic acid end groups in an amount ranging from 10 to 150 meq/Kg; from 0 pbw to 1 pbw, based on 100 pbw of the polymer composition of a stabilizer selected from phenol-containing stabilizers, phosphorus-containing stabilizers, or a combination thereof; from 10 to 300 ppm, based on the weight of the polyethylene terephthalate, of antimony; from 0 to 300 ppm, based on the weight of the polyethylene terephthalate, of cobalt; and from 0 to 300 ppm, based on the weight of the polyethylene terephthalate, of titanium.

In another embodiment a thermoplastic polymer composition comprises: from 40 to 60 pbw of a polyetherimide that is the reaction product of a polymerization of 2,2-bis[4-(3,4-dicarboxyphenoxy)phenyl]propane dianhydride with meta-phenylene diamine, wherein the polyetherimide has a weight average molecular weight ranging from 5,000 to 80,000 Daltons, a halogen content that is less than 1000 ppm, and less than 100 ppm benzylic protons as measured by proton nuclear magnetic spectroscopy; from 40 to 60 pbw of at least one polyethylene terephthalate resin having a diethylene glycol content ranging from 0.1 to 4 wt %, an intrinsic viscosity that is more than 0 and less than 0.83 dl/g, and carboxylic acid end groups ranging from 10 to 150 meq/Kg; and from 0 pbw to 1 pbw stabilizer to said stabilizer is a phenol-containing or phosphorus-containing stabilizer or a mixture thereof; an antimony component ranging from 10 to 300 ppm, based on the weight of the polyethylene terephthalate; from 0 to 300 ppm cobalt; wherein the composition has a transparency that is more than 60% at 3.2 mm, and haze that is less than 10%, per as measured on a molded 3.2 mm thick sample in accordance with ASTM D1103, a single glass transition temperature ranging from 110 to 170° C., a melt flow rate of from 10 to 100 cc/mm, determined on dried pellets in accordance with ASTM D1238 at 295° C. using a 1.2 Kg weight; wherein the composition is bisphenol A free.

A method for the manufacture of the above compositions, as well as articles comprising the compositions are also disclosed.

DETAILED DESCRIPTION OF THE INVENTION

Our invention is based on the unexpected discovery that polymer compositions containing a combination of a specific polyimide, a specific, low intrinsic viscosity polyester, and a specific combination of stabilizers, together with low levels of residues, can provide transparent articles with excellent physical properties. The polymer compositions are "bisphenol A free," as the term is defined below. Remarkably and advantageously, the transparency can be achieved even at higher levels of polyethylene terephthalate.

As used herein the singular forms "a," "an," and "the" include plural referents. The term "combination" is inclusive of blends, mixtures, alloys, reaction products, and the like. Unless defined otherwise, technical and scientific terms used herein have the same meaning as is commonly understood by one of skill in the art. The term "polymer" as used herein includes oligomers, homopolymers, and copolymers. Compounds are described using standard nomenclature. The term "and a combination thereof" is inclusive of a combination of one or more of the named components, optionally with one or more other components not specifically named that have essentially the same function.

The term "bisphenol A free" means that a composition of matter made in accordance to the composition of our invention, e.g., a composition or an article made from the composition, has less than 10 ppm of extractable bisphenol A as determined in accordance with migration protocols described in "Guidance for Industry: Preparation of Premarket Submissions for Food Contact Substances: Chemistry Recommendations" U.S. Department of Health and Human Services, Food and Drug Administration, Center for Food Safety and Applied Nutrition: April 2002; December 2007. In some instances the article will have no extractable BPA within the detection limits of chromatographic analyses. Extraction may be done with a variety of simulated foods including aqueous ethanolic or and fatty food simulants.

Other than in the operating examples or where otherwise indicated, all numbers or expressions referring to quantities of ingredients, reaction conditions, and the like, used in the specification and claims are to be understood as modified in all instances by the term "about." Various numerical ranges are disclosed in this patent application. Because these ranges are continuous, they include every value between the minimum and maximum values. The endpoints of all ranges reciting the same characteristic or component are independently combinable and inclusive of the recited endpoint. Unless expressly indicated otherwise, the various numerical ranges specified in this application are approximations. The term "from more than 0 to an amount" means that the named component is present in some amount more than 0, and up to and including the higher named amount.

All ASTM tests and data are from the 2003 edition of the Annual Book of ASTM Standards unless otherwise indicated.

As used herein, "alkyl" means a straight or branched chain alkyl group, preferably a $(C_{1-18})$ alkyl group, and includes for example methyl, ethyl n-butyl, isobutyl, tert-butyl, octyl, decyl, stearyl. "Alkoxy" means a straight or branched alkoxy group, preferably a $(C_{1-18})$ alkoxy group, and includes, for example, methoxy, ethoxy, butoxy, and nonyloxy. "Aryl" means a group containing an unsaturated ring of six carbon atoms, which may optionally be substituted with one or more alkyl groups, and includes, for example, phenyl, tolyl, and xylyl. "Aryloxy" means an oxygen radical that is substituted with an unsaturated ring of six carbon atoms, which itself may optionally be substituted with one or more alkyl groups, and includes, for example, phenoxy.

In the polymer compositions, the polyimide is a polyetherimide and/or polyetherimide sulfone. The polyester is polyethylene terephthalate ("PET") having (i) a diethylene glycol derived content ranging from 0.1 to 4 weight %, (ii) an intrinsic viscosity (IV) that is more than 0 and less than 0.83 dl/g (referred to here as "low IV PET"), and (iii) carboxylic acid end groups in an amount from 10 to 150 meq/Kg. The stabilizers include a phenol-containing stabilizer, a phosphorus-containing stabilizer, or a combination thereof. Finally, the polymer compositions contain low levels of antimony, and optionally cobalt and titanium.

The polyetherimides and polyetherimide sulfones are of formula (1)

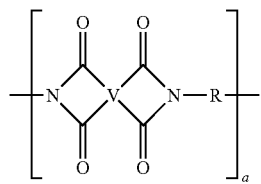
(1)

wherein a is more than 1, for example 10 to 1,000 or more, or more specifically 10 to 500.

The group V in formula (1) is a tetravalent linker containing an ether group (a "polyetherimide" as used herein) or a combination of an ether groups and arylene sulfone groups (a "polyetherimide sulfone" as used herein). Such linkers include but are not limited to: (a) substituted or unsubstituted, saturated, unsaturated or aromatic monocyclic and polycyclic groups having 5 to 50 carbon atoms, optionally substituted with ether groups, arylene sulfone groups, or a combination of ether groups and arylene sulfone groups; and (b) substituted or unsubstituted, linear or branched, saturated or unsaturated alkyl groups having 1 to 30 carbon atoms and optionally substituted with ether groups or a combination of ether groups, arylene sulfone groups, and arylene sulfone groups; or combinations comprising at least one of the foregoing. Suitable additional substitutions include, but are not limited to, ethers, amides, esters, and combinations comprising at least one of the foregoing.

The R group in formula (1) includes but is not limited to substituted or unsubstituted divalent organic groups such as: (a) aromatic hydrocarbon groups having 6 to 20 carbon atoms and halogenated derivatives thereof; (b) straight or branched chain alkylene groups having 2 to 20 carbon atoms; (c) cycloalkylene groups having 3 to 20 carbon atoms, or (d) divalent groups of formula (2)

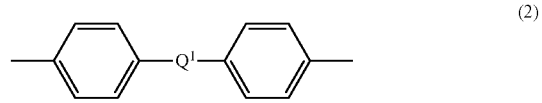
(2)

wherein $Q^1$ includes but is not limited to a divalent moiety such as —O—, —S—, —C(O)—, —SO$_2$—, —SO—, —C$_y$H$_{2y}$— (y being an integer from 1 to 5), and halogenated derivatives thereof, including perfluoroalkylene groups.

In an embodiment, linkers V include but are not limited to tetravalent aromatic groups of formula (3)

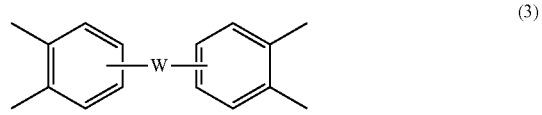
(3)

wherein W is a divalent moiety including —O—, —SO$_2$—, or a group of the formula —O—Z—O— wherein the divalent bonds of the —O— or the —O—Z—O— group are in the 3,3', 3,4', 4,3', or the 4,4' positions, and wherein Z includes, but is not limited, to divalent groups of formulas (4)

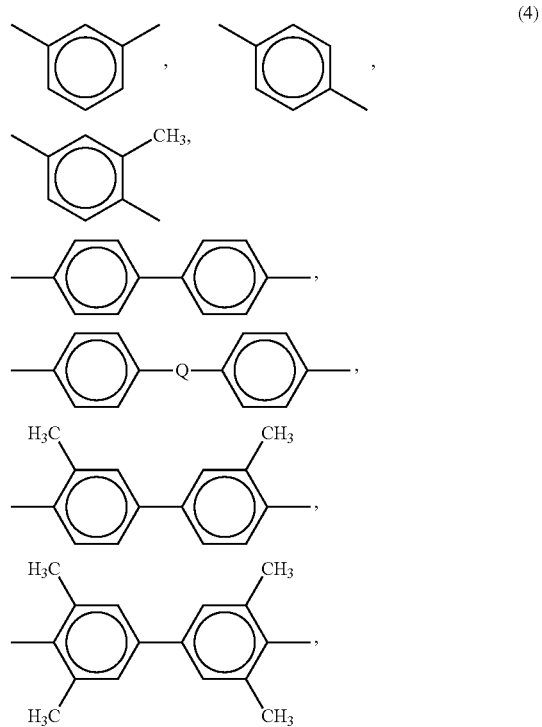
(4)

-continued

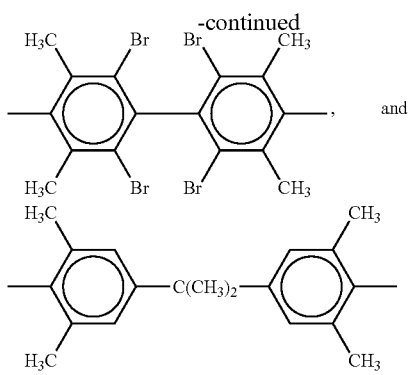

wherein Q includes but is not limited to a divalent moiety including —O—, —S—, —C(O)—, —SO$_2$—, —SO—, —C$_y$H$_{2y}$— (y being an integer from 1 to 5), and halogenated derivatives thereof, including perfluoroalkylene groups.

In a specific embodiment, the polyetherimide comprise more than 1, specifically 10 to 1,000, or more specifically, 10 to 500 structural units, of formula (5)

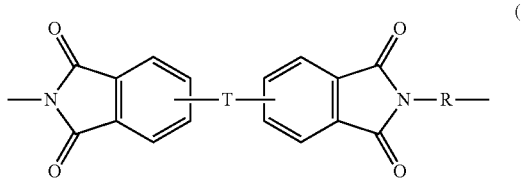

(5)

wherein T is —O— or a group of the formula —O—Z—O— wherein the divalent bonds of the —O— or the —O—Z—O— group are in the 3,3', 3,4', 4,3', or the 4,4' positions; Z is a divalent group of formula (3) as defined above; and R is a divalent group of formula (2) as defined above.

In another specific embodiment, the polyetherimide sulfones are polyimides comprising ether groups and sulfone groups wherein at least 50 mole % of the linkers V and the groups R in formula (1) comprise a divalent arylene sulfone group. For example, all linkers V, but no groups R, can contain an arylene sulfone group; or all groups R but no linkers V can contain an arylene sulfone group; or an arylene sulfone can be present in some fraction of the linkers V and R groups, provided that the total mole fraction of V and R groups containing an aryl sulfone group is greater than or equal to 50 mole %.

Even more specifically, polyetherimide sulfones can comprise more than 1, specifically 10 to 1,000, or more specifically, 10 to 500 structural units of formula (6)

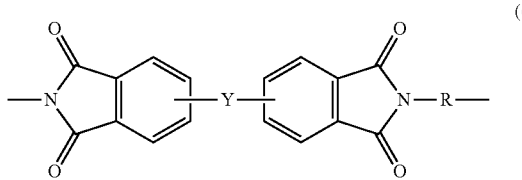

(6)

wherein Y is —O—, —SO$_2$—, or a group of the formula —O—Z—O— wherein the divalent bonds of the —O—, SO$_2$—, or the —O—Z—O— group are in the 3,3', 3,4', 4,3', or the 4,4' positions, wherein Z is a divalent group of formula (3) as defined above and R is a divalent group of formula (2) as defined above, provided that greater than 50 mole % of the sum of moles Y+ moles R in formula (2) contain —SO$_2$— groups.

It is to be understood that the polyetherimides and polyetherimide sulfones can optionally comprise linkers V that do not contain ether or ether and sulfone groups, for example linkers of formula (7).

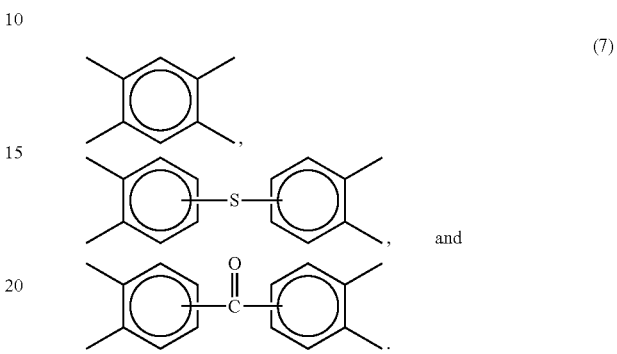

(7)

Imide units containing such linkers are generally be present in amounts ranging from 0 to 10 mole % of the total number of units, specifically 0 to 5 mole %. In one embodiment no additional linkers V are present in the polyetherimides and polyetherimide sulfones.

In another specific embodiment of the polymer composition, the polyetherimide comprises 10 to 500 structural units of formula (5) and the polyetherimide sulfone contains 10 to 500 structural units of formula (6).

The polyetherimide and polyetherimide sulfones can be prepared by various methods, including, but not limited to, the reaction of an aromatic bisanhydride of the formula (8) or (9)

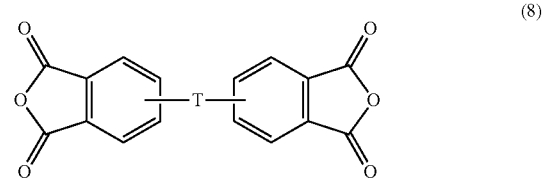

(8)

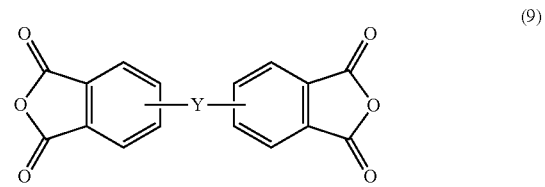

(9)

with an organic diamine of the formula (10)

H$_2$N—R—NH$_2$ (10)

wherein R, T, and Y are as defined above in formulas (2), (5), and (6).

Illustrative examples of specific aromatic bisanhydrides of formula (8) include: 2,2-bis[4-(3,4-dicarboxyphenoxy)phenyl]propane dianhydride; 4,4'-bis(3,4-dicarboxyphenoxy) diphenyl ether dianhydride; 4,4'-bis(3,4-dicarboxyphenoxy) diphenyl sulfide dianhydride; 4,4'-bis(3,4-dicarboxyphenoxy)benzophenone dianhydride; 2,2-bis[4-(2,3-dicarboxyphenoxy)phenyl]propane dianhydride; 4,4'-bis(2,3-dicarboxyphenoxy)diphenyl ether dianhydride; 4,4'-bis (2,3-dicarboxyphenoxy)diphenyl sulfide dianhydride; 4,4'-bis(2,3-dicarboxyphenoxy)benzophenone dianhydride; 4-(2,3-dicarboxyphenoxy)-4'-(3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; and 4-(2,3-dicarboxyphenoxy)-4'-(3,4-dicarboxyphenoxy)benzophenone dianhydride. Combinations comprising at least one of the foregoing can be used.

Illustrative examples of specific aromatic bisanhydrides containing sulfone groups of formula (9) include: 4,4'-bis(3,4-dicarboxyphenoxy)diphenyl sulfone dianhydride; 4,4'-bis (2,3-dicarboxyphenoxy)diphenyl sulfone dianhydride; and 4-(2,3-dicarboxyphenoxy)-4'-(3,4-dicarboxyphenoxy) diphenyl sulfone dianhydride. Combinations comprising at least one of the foregoing can be used. In addition, the polyetherimide sulfones can be prepared using a combination of bisanhydrides of formula (8) and formula (9).

Illustrative examples of amine compounds of formula (10) include: ethylenediamine, propylenediamine, trimethylenediamine, diethylenetriamine, triethylenetetramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis(3-aminopropyl) amine, 3-methoxyhexamethylenediamine, 1,2-bis(3-aminopropoxy)ethane, bis(3-aminopropyl)sulfide, 1,4-cyclohexanediamine, bis-(4-aminocyclohexyl)methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl)methane, bis(2-chloro-4-amino-3,5-diethylphenyl)methane, bis(4-aminophenyl)propane, 2,4-bis(b-amino-t-butyl)toluene, bis (p-b-amino-t-butylphenyl)ether, bis(p-b-methyl-o-aminophenyl)benzene, bis(p-b-methyl-o-aminopentyl)benzene, 1,3-diamino-4-isopropylbenzene, bis(4-aminophenyl)ether and 1,3-bis(3-aminopropyl)tetramethyldisiloxane. Mixtures of these amines can be used.

Illustrative examples of amine compounds of formula (10) containing sulfone groups include but are not limited to, diamino diphenyl sulfone (DDS) and bis(aminophenoxy phenyl)sulfones (BAPS). Combinations comprising any of the foregoing amines can be used.

In one embodiment of the polymer composition, the polyetherimide comprises structural units of formula (5) wherein each R is independently p-phenylene or m-phenylene or a mixture comprising at least one of the foregoing; and T is group of the formula —O—Z—O— wherein the divalent bonds of the —O—Z—O— group are in the 3,3' positions, and Z is a divalent group of formula (11)

(11)

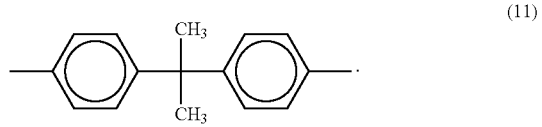

Further, the polyetherimide sulfone comprises structural units of formula (6) wherein at least 50 mole % of the R groups are of formula (4) wherein Q is —SO$_2$— and the remaining R groups are independently p-phenylene or m-phenylene or a combination comprising at least one of the foregoing; and T is group of the formula —O—Z—O— wherein the divalent bonds of the —O—Z—O— group are in the 3,3' positions, and Z is a divalent group of formula (11) as defined above.

The polyetherimide and polyetherimide sulfone can be used alone or in combination. In one embodiment, only the polyetherimide is used. In another embodiment, the weight ratio of polyetherimide:polyetherimide sulfone can be from 99:1 to 50:50.

The polyetherimides and polyetherimide sulfones have a weight average molecular weight (Mw) of 5,000 to 80,000 Daltons. Weight average molecular weight can be measured by gel permeation chromatography, using a polystyrene standard.

In an embodiment, the polyetherimide and/or the polyetherimide sulfone has a benzylic proton content of the less than 100 ppm, based on parts by weight of the polymer, as determined by proton nuclear magnetic resonance spectroscopy. Benzylic proton functionality may react at high temperatures to accelerate reactions that change molecular weight in the melt. In another embodiment, polyetherimide and/or the polyetherimide sulfone are essentially free of benzylic protons. Essentially free of benzylic protons means that the polyimide sulfone product has less than 5 mole % of structural units, or less than 3 mole % structural units, or less than 1 mole % structural units derived from monomers and/or end cappers containing benzylic protons. In one embodiment essentially free of benzylic protons means that the polyetherimide sulfone resin has 0 ppm, based on parts by weight of the polymer, as determined by proton nuclear magnetic resonance spectroscopy or 0 mole % of structural units derived from monomers and/or end cappers containing benzylic protons.

In an embodiment, the polyetherimide and/or the polyetherimide sulfone has a bromine or chlorine content of less than or equal to 1000 ppm, based parts by weight of the polyetherimide and/or the polyetherimide sulfone. The amount of bromine or chlorine can be determined by ordinary chemical analysis such as atomic absorption. In a specific embodiment, the polyetherimide and/or the polyetherimide sulfone has a total bromine plus chlorine content of less than or equal to 1000 ppm, specifically 0 to 1000 ppm, more specifically more than 0 to 500 ppm.

The polyetherimide and/or the polyetherimide sulfone further can have low levels of organic reaction byproducts, in particular, a content of 0 to 500 ppm, specifically 0 to 250 ppm of each of 1,3-bis(N-(4-chlorophthalimido))benzene, 1,3-bis (N-phthalimido)benzene, meta-phenylene diamine, and bis (phthalimide), based on parts by weight of the polyetherimide and/or the polyetherimide sulfone.

Representative polyetherimides are those produced under the ULTEM® trademark, including, but not limited to ULTEM®1000, ULTEM®1010 and ULTEM 9011 resin by SABIC Innovative Plastics. PEI resins are further described in ASTM D5205.

The polymer compositions further comprise a low intrinsic viscosity polyethylene terephthalate ("PET"), specifically a PET having (i) a diethylene glycol derived content ranging from 0.1 to 4 wt %, based on the weight of the polyethylene terephthalate, (ii) an intrinsic viscosity that is more than 0 and less than 0.83 dl/g, and (iii) a carboxylic acid end groups content in an amount ranging from 10 to 150 meq/K.

As used herein, "diethylene" refers to groups of the formula —(C$_2$H$_4$)O(C$_2$H$_4$)— that are incorporated into the PET polymer by reaction of diethylene glycol with terephthalic acid or an ester of terephthalic acid, such as dimethyl terephthalate. The diethylene glycol content of the PET is from 0.1 to 4 wt %, more specifically from 0.1 to 2 wt %, and still more specifically from 0.1 to 1 wt %.

The intrinsic viscosity ("IV") of the PET is more than 0 to less than 0.83 dl/g, more specifically more than 0.2 to less than 0.65 dl/g, even more specifically 0.50 dl/g to less than 0.60 dl/g. As used herein, the term "intrinsic viscosity" is the ratio of the specific viscosity of a polymer solution of known concentration to the concentration of solute, extrapolated to zero concentration. Intrinsic viscosity, which is widely recognized as standard measurements of polymer characteristics, is directly proportional to average polymer molecular weight. Intrinsic viscosity can be measured and determined without undue experimentation by those of ordinary skill in this art. The intrinsic viscosity can be determined by dissolving the polyethylene terephthalate in a 60:40 phenol:tetra chloroethane (TCE) solution in accordance with ASTM 4603. A PET with an IV that is more than 0 and less than 0.83 dl/g, is referred to herein as a "low IV PET." A PET with an IV that is 0.83 dl/g or greater is referred to herein as a "high IV PET."

The PET further contains carboxylic acid end groups in an amount ranging from 10 to 150 meq/K, specifically 10 to 100 meq/K, more specifically from 20 to 50 meq/K. Methods for modifying the number of carboxylic acid end groups depend on the methods used to manufacture PET, and are known in the art.

Methods for the manufacture of PET with the specified ethylene content, IV, and carboxylic acid end groups are known. For example, PET having a low ethylene content can be formed, for example transesterification of a dialkyl terephthalate such as dimethyl terephthalate (DMT) and ethylene glycol in the presence of a manganese, zinc, titanium, antimony or lithium catalyst to form a tranesterification product that is a mixture of low molecular weight esters with a degree of polymerization of 1, 2, or 3, in which most of the end groups are glycoxyl. The transesterification product is then further polymerized to high molecular weight polymer in the presence of a catalyst. The IV is adjusted by adjusting the degree of polymerization of the final product, for example. To obtain the desired level of carboxylic end groups, for example, one process for the preparation of linear PET comprises reacting terephthalic acid with an excess of an ethylene glycol under conditions effective to reach the clearing point of the reaction; pre-polymerizing the cleared reaction mixture under conditions effective to produce oligomers having an intrinsic viscosity measured in 60:40 phenol:1,1,2,2-tetrachloroethane by weight at 25° C. of less than about 0.7 deciliters/gram (dl/g) and a carboxylic acid end group number of less than about 100 milliequivalents per kilogram (meq/kg); and polycondensing the oligomer under conditions effective to produce linear poly(alkylene terephthalate) resins having an intrinsic viscosity measured in 60:40 phenol:1,1,2,2-tetrachloroethane by weight at 25° C. of about 0.4 to about 0.83 dl/g and a carboxylic acid end group number of about 10 to about 100 meq/kg.

As is known in the art, PET can contain other polyester units, e.g., units derived from other diols, for example aliphatic diols such as 2-propanediol, 1,3-propanediol, 1,2-butanediol, 1,3-butanediol, 1,4-butanediol, 2,3-butanediol, diethylene glycol, 1,5-pentanediol, neopentyl glycol, triethylene glycol or poly(ethylene glycol), aliphatic polyhydric alcohols such as trimethylolpropane or pentaerythritol, and alicyclic diols such as 1,4-cyclohexanedimethanol or 1,4-cyclohexanediethanol. However, in an embodiment, the PET contains groups derived from a diol other than ethylene glycol in an amount of less than 20 wt %, specifically less than 10 wt %, more specifically less than 5 wt %, and even more specifically less than 1 wt %. In a specific embodiment, the PET has a content of groups derived from cyclohexane dimethanol of less than 1 weight percent.

The polyethylene terephthalate is preferably linear, that is, has less than 3 wt. %, specifically less than 2 wt %, more specifically less than 1 wt % of cyclic polyester as determined by proton nuclear magnetic resonance spectroscopy. In an embodiment, no cyclic polyester is detectable by proton nuclear magnetic resonance spectroscopy.

Similarly PET can contain units derived from diacids other than terephthalic acid, e.g., 5-sulfoisophthalic acid (sodium salt), 2,6-naphthalenedicarboxylic acid, 4,4'-diphenyldicarboxylic acid, diphenylsulfodicarboxylic acid, trimellitic acid, pyromellitic acid or an acid anhydride thereof, oxalic acid, succinic acid, adipic acid, sebacic acid, azelaic acid or decanedicarboxylic acid. However, in an embodiment, the PET contains groups derived from a diacid other than terephthalic acid in an amount of less than 20 wt %, specifically less than 10 wt %, more specifically less than 5 wt %, and even more specifically less than 1 wt %. units derived from and an isophthalic acid unit content of less than 5 weight percent. In a specific embodiment, the PET has a content of groups derived from isophthalic acid in an amount of less than 5 wt %. For example, the PET has a content of groups derived from cyclohexane dimethanol of less than 1 weight percent and groups derived from isophthalic acid in an amount of less than 5 wt %.

The melting temperature of the low IV PET is from 240° C. to 260° C., specifically from 245° C. to 255° C., or from 255° C. to 260° C. The melting point can be determined by differential scanning calorimetry (DSC) with a heating rate of 10° C./min. as described in ASTM D3418.

The molecular weight of the low IV PET at least 25,000 g/mol, specifically from 25,000 to 75,000 g/mol, more specifically from 45,000 to 60,000 g/mol.

The low IV PET has a single Tg from 70° C. to 90° C., more specifically from 80° C. to 85° C., even more specifically, from 81° C. to 83° C.

In a further embodiment, the polyethylene terephthalate can be derived from a recycled PET. Recycled PET includes post-consumer waste PET, as well as or scrap PET, for example PET trimmed from molded articles, PET flakes, PET film and fiber, and articles rejected due to quality imperfections. The scrap polyester can be added to process lines making the PET, or can be used in regrind form as 100% scrap materials, or mixed with virgin PET. In some instances the recycled PET is colorless with a yellowness index (YI) of less than 5. The recycled PET should have less than 0.1 wt % of poly vinyl chloride (PVC).

A commercially available a low IV PET can be obtained from Akra Polyesters S.A. de C.V. under the trade designation "5F0441RP", and has an intrinsic viscosity of 0.56 dl/g.

In addition to the polyetherimide and or polyetherimide sulfone, the polymer compositions can have low levels of a stabilizer composition, in addition to low levels of an antimony, cobalt, and titanium.

The stabilizer composition includes a phosphorus-containing compound, a phenol-containing compound, or a combination thereof. In an embodiment, the stabilizer composition comprises a combination of the phosphorus-containing compound and the phenol-containing compound in a ratio of 1:2 to 2:1.

Suitable phosphorus-containing stabilizer compounds exhibit low volatility. The volatility of a phosphorous-containing stabilizer compound may be measured by thermo gravimetric analysis, that is, by heating a sample of the compound and monitoring the relative amount of a sample of the compound that remains non-evaporated as the temperature of the sample is increased. In an embodiment, at least 10 wt %, preferably at least 30 wt %, even more preferably at least 50 wt %, and still more preferably at least 70 wt % of the initial amount of a sample of the compound remains upon heating of the sample from room temperature to 300° C. at a heating rate of 20° C. per minute under an inert atmosphere, such as nitrogen.

In a specific embodiment, the phosphorous-containing compound is a compound of the structural formula P—R'$_b$ wherein each R' is independently H, alkyl, alkoxy, aryl, aryloxy or oxo, and b is 3 or 4. Specific representative phosphorous-containing stabilizer compounds include the reaction product of phosphorus trichloride with 1,1-biphenyl and 2,4-t-butylphenol, sodium phenyl phosphonate, 2,4-di-tert-butylphenyl phosphite, and mixtures thereof. In an embodiment, the phosphorus-containing stabilizer is tris (2,4-di-tert-butylphenyl)phosphite. The phosphorus compound may also be an aryl phosphonite compound. One example of a phosphonite compounds is PEPQ (from Clairant Co.), which is a biphenyl based di tert butyl phenyl phosphonite mixture produced by condensation of 2,4-di tert-butyl phenol with the Friedel Crafts addition product of phosphorus trichloride and biphenyl. Other examples are described in U.S. Pat. Nos. 3,825,629, 3,962,175, and 4,075,163.

Examples of hindered phenol compounds are, for instance: 1,3,5-trimethyl-2,4,6-tris(3,5-di-tertbutyl-4-hydroxybenzyl) benzene (IRGANOX 1330 from Ciba Co.), 3,5-di-tertbutyl-4-hydroxyhydrocinnamic acid triester with 1,3,5-tris(2-hydroxyethyl)-S-triazine-2,4,6-(1H,3H,5H)-trione (IRGANOX 3125 from Ciba Co.), tetrakis [methylene-(3,5-di-tertbutyl-4-hydroxycinnimate)]methane (IRGANOX 1010 from Ciba Co.), o,o-di-n-octadecyl-3,5-di-tertbutyl-4-hydroxy benzyl phosphonate (IRGANOX 1093 from Ciba Co.) N,N'-1,6-hexanediyl bis[3,5-(1,1-dimethylethyl)-4-hydroxy benzene propanamide (IRGANOX 1098 from Ciba Co.) 2,2'-oxamido bis-[ethyl-3-(3,5-di-tertbutyl-4-hydroxyphenyl)propionate] (NAUGARD XL-1 from Crompton Co.) and 6-[3-(3-t-butyl-4-hydroxy-5-methyl)propoxy]-2,4,8,10-tetra-t-butyldibenz[d-,f][1,3,2]-dioxaphosphepin (SUMILIZER GP from Sumitomo Co.).

In some instances the transparent resin blends may further contain an alkyl amide compounds for improved mold release. The alkyl amide compounds can be of any structure and any effective amount to reduce mold release pressure while maintaining transparency and having suitable melt processability such that parts can be molded with no splay or other blemishes.

Exemplary alkyl amides are of Formulas (12) and (13)

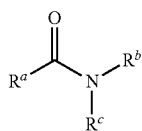

(12)

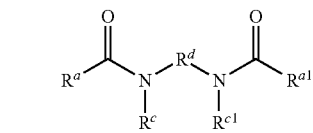

(13)

wherein $R^a$ and $R^{a1}$ are each independently a $C_1$ to $C_{36}$ alkyl group; $R^b$, $R^c$ and $R^{c1}$ are each independently hydrogen or a $C_1$ to $C_{30}$ alkyl group; and $R^d$ is a $C_2$ to $C_6$ alkyl group.

The alkyl groups can be linear or branched; they may also be monocyclic, bicyclic or polycyclic. The alkyl groups may further contain one or more double bonds. Any mixture of the same or different alkyl groups can be present in the alkyl amide compound. Combinations of two or more alkyl amides can also be used. Examples of specific alkyl amides are the primary amides (e.g., where $R^b$ an $R^c$ are each hydrogen), the $C_1$ to $C_6$ N-alkyl amides (e.g., where $R^b$ is hydrogen and $R^c$ is a $C_1$ to $C_6$ alkyl group or each $R^c$ and $R^{c1}$ is a $C_1$ to $C_6$ alkyl group), and the $C_1$ to $C_6$ secondary amides of linear or branched $C_{12-36}$ alkyl carboxylic acids (e.g., where $R^a$ is a $C_{12-36}$ alkyl group and $R^c$ is a $C_{1-6}$ alkyl group, or where $R^a$ and $R^{a1}$ are each a $C_{12-36}$ alkyl group, each $R^c$ and $R^{c1}$ is a $C_{1-6}$ alkyl group. Alkyl amides can be made by reaction of ammonia, monoamines, diamines or mixture thereof with carboxylic acids. Examples of carboxylic acids are erucic acid, stearic acid, oleic acid, linoleic acid, linolenic acid, myristic acid, palmitic acid, arachidonic acid, behenic acid, lignoceric acid, tridecanoic acid, elaidic acid, and mixtures thereof. Alkyl amides can include the $C_{6-20}$ bis amides of $C_{2-6}$ alkylene diamines and mixtures containing any of the foregoing carboxylic acids.

The alkyl amides can be present in the polymer composition in an amount from 0.01 to 2.0 wt %, or from 0.1 to 0.3 wt %, each based on the total weight of the composition.

Some alkyl amides will have a molecular weight of from about 250 to about 1000 Daltons. In other instances the alkyl amide will have a molecular weight of from 300 to 700 Daltons. Molecular weight can be determined from the chemical structure of the alkyl amide. If the molecular weight is too low the alkyl amide may be lost from the polymer mixture during melt processing by boiling or sublimation. If the alkyl amide molecular weight is too high, the alkyl amide may separate from the resin mixture causing haze and/or loss of transparency.

The polymer composition contains 0 to 1.0 parts by weight (pbw) of a stabilizer composition comprising a phenol-containing stabilizer, a phosphorous-containing stabilizer, or a combination thereof, specifically more than 0 to 0.8 pbw of the stabilizer composition, still more specifically 0.002 to 0.5 pbw, and even more specifically 0.05 to 0.08 pbw, each based on 100 parts by weight of the polymer composition.

The antimony component, cobalt, and titanium are generally present in the compositions as the residues of catalysts used to form the polymer components, in particular the PET. They may also be added as colorants. In some instance these metals can have undesirable reaction with the molten polymers resulting in changes in viscosity and/or color and appearance.

The polymer composition thus comprises a low IV PET that contains from 10 to 300 parts per million (ppm) of antimony, based on parts by weight of the low IV PET. More specifically, the low IV PET comprises 10 to 240 ppm, specifically 12 to 200 ppm, more specifically 12 to 100 ppm of antimony, each based on based on the parts by weight of the low IV polyethylene terephthalate. The antimony can be derived from compounds such as antimony trioxide, antimony pentoxide, antimony acetate, methoxy antimony, triphenyl antimony, or antimony glycolate.

The low IV PET further comprises low amounts of cobalt and titanium, specifically from 0 to 300 ppm, specifically from 0 or more than 0 to 200 ppm of cobalt, more specifically from 0 or more than 0 to 100 ppm of cobalt, based on the parts by weight of the low IV PET. Similarly, the low IV PET 0 to 300 ppm of titanium, specifically from 0 or more than 0 to 100 ppm, more specifically from 0 or more than 0 to 50 ppm, and still more specifically from 0 or more than 0 to 10 ppm of titanium, each based on the parts by weight of the low IV PET.

Other inorganic residues are preferably present in the polymer compositions at low levels, for example from 0 or more than 0 to 1000 ppm, specifically from 0 or more than 0 to 500 ppm, still more specifically from 0 or more than 0 to 300 ppm. Examples of such inorganic residues include metals such as germanium, tin, aluminum and aluminum salts. In a specific embodiment, the polymer composition has 0 to 10 ppm, or no detectable lead, mercury, cadmium, thallium, or arsenic.

In yet another embodiment the polymer composition will have less than 0.2 wt % of an alkaline or alkaline earth carboxylic acid salt, for example less than 0.2 wt % each of sodium acetate, sodium stearate, potassium stearate, calcium stearate, magnesium stearate, calcium tartrate, sodium citrate, potassium oleate, disodium adipate, dipotassium succinate, sodium benzoate, and the like. In another embodiment, the total amount of any alkaline or alkaline earth carboxylic acid salt is less than 0.2 wt. %, based on the total weight of the polymer composition.

The polymer composition can optionally contain various fillers and/or additives, provided that such fillers and/or additives do not significantly adversely affect the desired properties of the polymer compositions such as transparency and haze. Exemplary additives include UV absorbers, heat stabilizers, light stabilizers, lubricants, plasticizers, pigments, dyes, colorants, and anti-static agents. When present, the additives are generally used in amounts from 0.01 to 5 wt % of the polymer composition.

The preparation of the polymer compositions is normally achieved by blending the ingredients under conditions for the formation of an intimate blend. Such conditions often include melt mixing in single or twin screw type extruders, mixing bowl, or similar mixing devices which can apply a shear to the components. Twin-screw extruders are often preferred due to their more intensive mixing capability and self-wiping capability, over single screw extruders. It is often advantageous to apply a vacuum to the blend through at least one vent port in the extruder to remove volatile impurities in the composition. Often it is advantageous to dry the PET and polyimide polymers prior to melting. The melt processing is often done at 290 to 340° C. to avoid excessive polymer degradation while still allowing sufficient melting to get an intimate polymer mixture free of any unmelted components. The polymer blend can also be melt filtered using a 40 to 100 micron candle or screen filter to remove undesirable black specks or other heterogeneous contaminants.

In an exemplary process, the various components are placed into an extrusion compounder to produce a continuous strand that is cooled and then chopped into pellets. In another procedure, the components are mixed by dry blending, and then fluxed on a mill and comminuted, or extruded and chopped. The composition and any optional components can also be mixed and directly molded, e.g., by injection or transfer molding techniques. Preferably, all of the components are freed from as much water as possible. In addition, compounding is carried out to ensure that the residence time in the machine is short; the temperature is carefully controlled; the friction heat is utilized; and an intimate blend between the components is obtained.

The composition can then be molded in any equipment conventionally used for thermoplastic compositions, such as a Newbury or van Dorn type injection molding machine with conventional cylinder temperatures, at 250° C. to 320° C., and conventional mold temperatures at 55° C. to 120° C.

The physical properties of the polymer composition can be varied to achieve the desired performance properties by varying factors such as the composition components, the equipment used, process parameters, and the like.

Here, these factors are selected to produce a polymer composition having less than 10 ppm of extractable bisphenol A ("BPA") as determined in accordance with migration protocols established by the U.S. Food and Drug Administration (FDA) in "Guidance for Industry: Preparation of Premarket Submissions for Food Contact Substances: Chemistry Recommendations," U.S. Department of Health and Human Services, FDA, Center for Food Safety and Applied Nutrition (April 2002; December 2007). Polymer products designated for food service applications may be evaluated using migration testing protocols established by the FDA. Often several types of extracting fluids are used in a series of tests. The polyimide-low IV PET combinations described herein can be tested with a water-based (ethanolic) food simulants comprising 10% ethanol, 50% ethanol and 3% acetic acid, used for the FDA's Condition of Use A, while olive oil (fatty food) was used for Condition of Use J. In these tests, no detectable levels of BPA were found in the simulants. Analysis was done using high-pressure liquid chromatography (HPLC) with a fluorescence detector. The term "bisphenol A free" means that a composition of matter made in accordance to the composition of our invention, e.g., a composition or an article made from the composition, has less than 10 ppm of extractable bisphenol A as determined in accordance with migration protocols described in "Guidance for Industry: Preparation of Premarket Submissions for Food Contact Substances: Chemistry Recommendations" U.S. Department of Health and Human Services, Food and Drug Administration, Center for Food Safety and Applied Nutrition: April 2002; December 2007. In some instances the article will have no extractable BPA within the detection limits of chromatographic analyses. Extraction may be done with a variety of simulated foods including aqueous ethanolic or and fatty food simulants.

In a specific embodiment (1), less than 10 ppm, specifically no bisphenol A, is detected via HPLC in either of a 10% ethanol/water (v/v) extract incubated with a molded sample of the composition (volume of extract to surface area of molded sample=62.669 mL/cm$^2$) for (a) 249.8° F. for 2 hours, and (b) 249.8° F. for 2 hours followed by 104° F. for 10 days.

In another specific embodiment (2), less than 10 ppm, specifically no bisphenol A, is detected via HPLC in either of a 50% ethanol/water (v/v) extract incubated with a molded sample of the composition (volume of extract to surface area of molded sample=62.669 mL/cm$^2$) for (a) 249.8° F. for 2 hours, and (b) 249.8° F. for 2 hours followed by 104° F. for 10 days.

In another specific embodiment (3), less than 10 ppm, specifically no bisphenol A, is detected via HPLC in either of a f 3% acetic acid/water (w/v) extract incubated with a molded sample of the composition (volume of extract to surface area of molded sample=62.669 mL/cm$^2$) for (a) 249.8° F. for 2 hrs, and (b) 249.8° F. for 2 hrs, followed by 104° F. for 10 days.

In another specific embodiment (4), less than 10 ppm, specifically no bisphenol A, is detected via HPLC in either of an olive oil extract incubated with a molded sample of the composition (volume of extract to surface area of molded sample=62.669 mL/cm$^2$) for (a) 249.8° F. for 2 hrs, and (b) 375.8° F. for 4 hrs.

Still further, the molded compositions can have any two or more of the characteristics of embodiments (1), (2), and (3). Still further, a molded sample of the composition has the characteristics of all three of embodiments (1), (2), and (3).

The molded compositions provide an excellent balance of transparency and physical properties, including tensile modulus, tensile yield strength, flexural modulus, melt flow rate, and/or heat distortion temperature.

The transparency (% T) of the polymer compositions can be more than 60%, more specifically more than 65%, even more specifically, more than 70% as measured on a molded 3.2 mm thick sample in accordance with ASTM D1003. The haze (H %) of the polymer composition can be less than 10%, more specifically less than 5%, even more specifically, less than 3%, as measured on a molded 3.2 mm thick sample in accordance with ASTM D1003.

The melt flow rate (MFR) of the polymer composition can be from 1 to 100 cc/mm, specifically form 1 to 50 cc/mm, more specifically from 5 to 25 cc/mm, each determined on dried pellets in accordance with ASTM D1238 at 295° C. using a 1.2 Kg weight. Such a high flow rate allows for the PET-polyimide to have considerably easier molding that the stiffer polyimide resin, the compositions also have much higher melt strength than the unmodified PET alone.

The tensile modulus of the polymer composition at 23° C., can be greater than 3,000 MPa, specifically greater than 3,300 MPa, and a tensile yield strength of greater than 50 MPa, specifically greater than 80 MPa as measured on a molded 3.2 mm type I bar in accordance with ASTM D638 with a crosshead speed of 50 mm/min. In an embodiment, the polymer composition can have a tensile modulus of greater than 3,300 MPa and a tensile strength of greater than 80 MPa.

The flexural modulus of the polymer composition at 23° C. can be greater than 3,000 MPa, specifically greater than 3,100 MPa, and a flexural strength of greater than 100 MPa, specifically great than 145 MPa, as measured on a molded 3.2 mm bar in accordance with ASTM method D790. In an embodiment, the polymer composition can have a flexural modulus of greater than 3,100 MPa and a flexural strength of greater than 145 MPa. The polymer compositions also retain high flexural modulus, greater than 1500 MPa, at temperatures as high as 125° C.

The polymer composition can have a single glass transition temperature of at least 110° C., specifically from 110° C. to 170° C., more specifically from 140° C. to 165° C.

In some embodiments, it has been found that the foregoing properties are maintained after exposure to heat and humidity. In particular, articles containing the polymer compositions can retain one or more of melt stability, clarity, and haze.

In an embodiment, the polymer composition has a bromine or chlorine content of less than or equal to 1000 ppm, based parts by weight of the polymer composition. The amount of bromine or chlorine can be determined by ordinary chemical analysis such as atomic absorption. In a specific embodiment, the polymer composition has a total bromine plus chlorine content of less than or equal to 1000 ppm, specifically 0 to 1000 ppm, more specifically more than 0 or 0 to 500 ppm, based on the polymer composition. Very low halogen content is desirable, in and some application, required, to meet many product safety and environmental regulations.

The polymer composition can be molded into useful articles, such as containers, by a variety of means such as injection molding and extrusion, among others conventionally known in the art. In particular, molded articles can be made by compression molding, blow molding, injection molding, and the like. The composition can be used to form parts in articles such as a wire (and/or wire coating), an optical fiber (and/or coating), a cable, a printed circuit board, a semiconductor, an automotive part, an outdoor product, a food or beverage container, serving utensil, tray, handle, a biomedical product, a composite material, a melt-spun mono- or multifilament fiber, an oriented or un-oriented fiber, a woven or non-woven fabric, a filter, a membrane, a film, a multi-layer- and/or multi-component film, a barrier film, a container, a bag, a bottle, a rod, a liner, a vessel, a pipe, a pump, a valve, a heat exchanger, an injection-molded article, a see-through article, a sealable packaging, a profile, heat-shrinkable film, and/or a thermoplastically welded part.

In an embodiment, the polymer composition can be molded to form into a container having a wall thickness ranging from 1.0 mm to 10.0 mm, and an internal volume ranging from 10 to 10,000 cc. Such an article can be used in medical, food service, and food preparation applications including the handing of dairy products and beer.

EXAMPLES

The following examples are included to provide additional guidance to those skilled in the art of practicing the claims. Accordingly, these examples are not intended to limit the scope of the claims.

Techniques and Procedures.

Blend Preparation Techniques.

Blends were prepared by extrusion of mixtures of PET with PEI in a 2.5-inch single screw, vacuum vented extruder. Samples were dried for at least 3 hr at 120° C. prior to extrusion. The extruder was set at 285 to 340° C. The blends were run at 90 rpm under vacuum. The extrudate was cooled, pelletized, and dried at 120° C. Test samples were injection molded at a set temperature of 290 to 320° C. and mold temperature of 100° C. using a 30 sec. cycle time.

Property Testing Procedures.

Properties were measured in accordance with ASTM test methods. All molded samples were conditioned for at least 48 h at 50% relative humidity prior to testing.

Percent transmittance (% T) and percent haze (% H) were measured per ASTM method D1003 at 3.2 mm.

Tensile properties were measured on 3.2 mm type I bars in accordance with ASTM method D638 with a crosshead speed of 50 mm/min.

Flexural properties were measured on 3.2 mm bars in accordance with ASTM method D790.

Heat distortion temperature (HDT) was measured at 0.46 MPa (66 psi) or 1.82 MPa (264 psi) on 3.2 mm thick bars in accordance with ASTM D648.

Unnotched and reversed notched Izod was measured in accordance with ASTM D256 using a 5 and 10 lb hammer respectively on 3.2 mm thick samples.

Melt flow rate (MFR) was run on dried pellets in accordance with ASTM D1238 at 295° C. using a 1.2 Kg weight.

Glass transition temperature (Tg) was determined by differential scanning calorimetry (DSC) with a 20° C./min. heating rate in accordance with ASTM D7426.

Bisphenol A (BPA) levels were determined by extraction in accordance with migration protocols established by the U.S. Food and Drug Administration (FDA) in "Guidance for Industry: Preparation of Premarket Submissions for Food Contact Substances: Chemistry Recommendations," U.S. Department of Health and Human Services, FDA, Center for Food Safety and Applied Nutrition (April 2002; December 2007). More particularly, BPA levels were determined as follows.

Materials for BPA Extraction.

PEI polymer disks with a diameter of 1.4993 inches (38.08 mm) and a thickness of 0.1245 inches (3.16 mm) were molded from pellets of the samples to be tested. Acetic acid from Merck, ethanol from Fluka, olive oil from Sigma-Aldrich, and Milli Q grade water were used to formulate the simulants. Bisphenol-A (4,4'-isopropylidenediphenol, CAS #80-05-7) with a purity of 99.1% was obtained from Aldrich (Lot#05124 KD) for use in analytical method development and validation studies. High pressure liquid chromatography (HPLC) grade methanol and hexanes were used in the analytical methods.

Equipment for BPA Extraction. Polytetrafluoroethylene (PTFE) extraction cells, a cell capping station (from CEM Corporation), glass crosses and a hot air oven (with temperature control of ±1° C.) were used to house the polymer disks and simulants during the incubation period. An Agilent Technologies 1200 series HPLC equipped with a Supelco Ascentis C18, 2.7 μm (150 mm×4.6 mm) column and a fluorescence detector (Excitation at 230 μm; Emission at 308 nm) was used for analysis of the extracts.

Procedure for BPA Extraction.

Two sample disks were washed with water and placed in an extraction cell separated from each other by glass crosses to ensure that the entire surface area of the disks is exposed to the simulant. Multiple (4-5) cells were prepared for each condition and simulant. Each cell was then filled with 80 mL of the specified simulant and capped. The volume of simulant to surface area of polymer disk was 9.7137 mL/in$^2$ (62.669 mL/cm$^2$). This ratio was used to estimate the migration level in terms of μg/in$^2$. The cells were then incubated using the following simulants and under the following conditions as described below and as shown in Table 1.

The specific food simulant, its concentration, incubation time period, and temperature were as follows. Samples of a concentration of 10% ethanol/water (v/v) were prepared and incubated at (a) 249.8° F. for 2 hours, and (b) 249.8° F. for 2 hours followed by 104° F. for 10 days. Samples of a concentration of 50% ethanol/water (v/v) were prepared incubated at (a) 249.8° F. for 2 hours, and (b) 249.8° F. for 2 hours followed by 104° F. for 10 days. Samples of a concentration of 3% acetic acid/water (w/v) were prepared incubated at (a) 249.8° F. for 2 hrs, and (b) 249.8° F. for 2 hrs, followed by 104° F. for 10 days. Samples of olive oil were prepared and incubated at (a) 249.8° F. for 2 hrs, and (b) 375.8° F. for 4 hrs. After the incubation period, the simulants were cooled to room temperature in preparation for testing.

TABLE 1

| Simulants and Conditions | |
|---|---|
| Food Simulants | Time/Temperature |
| 10% ethanol/water (v/v) | (a) 249.8° F. for 2 hrs. |
| | (b) 249.8° F. for 2 hrs, followed by 104° F. for 10 days |
| 50% ethanol/water (v/v) | (a) 249.8° F. for 2 hrs. |
| | (b) 249.8° F. for 2 hrs, followed by 104° F. for 10 days |

TABLE 1-continued

| Simulants and Conditions | |
|---|---|
| Food Simulants | Time/Temperature |
| 3% acetic acid/water (w/v) | (a) 249.8° F. for 2 hrs. |
| | (b) 249.8° F. for 2 hrs, followed by 104° F. for 10 days |
| Olive Oil | (a) 375.8° F. for 2 hrs |
| | (b) 375.8° F. for 4 hrs |

Testing for BPA Extraction.

1. Detection Limits. Limit of Quantification ("LOQ") is the lowest amount of analyte in a sample, which can be quantitatively determined with suitable precision and accuracy. Peaks are typically required to be about 10 times higher than the base line noise. Limit of detection ("LOD") is the lowest amount of analyte in a sample that can be detected but not necessarily quantified as an exact value. In chromatography the detection limit is the injected amount, which results in a peak that is at least 2-3 times as high as the base line noise. LOQs were determined by analyzing simulant blanks (noise) and BPA concentration standards (signal) that gave signal to noise ratios of 9 to 14. LODs were determined using BPA concentrations that gave signal to noise ratios of 3.1 to 4.3.

The LOD and LOQ of the food simulants were determined to be as followed. The samples at a concentration of 10% ethanol/water (v/v) had a LOD of 0.3 ng/L or ppb and a LOQ of 1 μg/L or ppb. The samples at a concentration of 50% ethanol/water (v/v) had a LOD of 0.3 μg/L or ppb and a LOQ of 1 ng/L or ppb. The samples at a concentration of 3% acetic acid/water (w/v) had a LOD of 0.3 μg/L or ppb and a LOQ of 1 μg/L or ppb. The olive oil samples had a LOD of 10 μg/L or ppb and a LOQ of 30 μg/L or ppb. The LOD and LOQ values are shown below in Table 2.

TABLE 2

| LOD and LOQ | | |
|---|---|---|
| Food Simulants | LOD (μg/L or ppb) | LOQ (μg/L or ppb) |
| 10% ethanol/water (v/v) | 0.3 | 1 |
| 50% ethanol/water (v/v) | 0.3 | 1 |
| 3% acetic acid/water (w/v) | 0.3 | 1 |
| Olive Oil | 10 | 30 |

2. Calibration curves were constructed for each simulant by making standard solutions from 1 to 5 ppb BPA for water-based simulants and from 30 to 80 ppb BPA for olive oil.

3. The extracts from each simulant/condition set of incubated cells were combined and then prepared for analysis. For water-based simulants, the extracts were directly analyzed. However, since the HPLC analytical method is typically more accurate when analyzing for BPA in a water-based media, a different sample preparation procedure was developed for olive oil. The olive oil was first mixed with hexanes to reduce the viscosity and then washed with a methanol-water mixture to transfer any BPA into the aqueous phase. The phases were then separated and the aqueous phase was used for the analysis. This same sample preparation procedure was followed for the olive oil blanks and the validation studies on olive oil extracts. All analysis was done in triplicate using the HPLC equipment described previously using a mobile phase of water and methanol. Validation studies were conducted for each simulant by spiking BPA into select extracts at the established LOQ levels and evaluating percent recovery using the analytical methods described previously.

Materials of Compositions/Articles.

The following materials were used. Components listed in the tables are based on wt. % of the total composition. Further in the Tables:

The polyetherimide ("PEI") was to ULTEM 1010 polyetherimide from SABIC Innovative Plastics, which is made by reaction of bisphenol A dianhydride with an equal molar amount of m-phenylene diamine, using either aniline or phthalic anhydride as end cap to control molecular weight. The PEI has an Mw of 33,200 as measured by gel permeation chromatography. It shows no melt flow at 295° C. The polymer further has a halogen content of less than 500 ppm, and less than 10 ppm of any heavy metals, including lead (Pb) mercury (Hg), cadmium (Cd), thallium (Tl) or arsenic (As).

Two PETs were compared in these experiments, one with a high IV and one with a low IV. "High IV PET" (IV=0.83 dl/g) was obtained from DAK Americas LLC (Laser+C, C61A). "Low IV PET" (IV=0.56 dl/g) was from Akra Polyesters S.A. de C.V. (5F0441RP).

Properties of these two PETs are shown in Table 3. Intrinsic viscosity (IV) can be determined in a 60:40 phenol:tetra chloroethane (TCE) solution of the polymer in accordance with ASTM 4603. Solution IV can also be correlated to melt viscosity measurements. Carboxylic acid end groups (COOH) can be measured in mille-equivalents/Kg of PET in accordance with ASTM 7409. Diethylene glycol content (DEG) can be determined by digestion of the polymer by methanolic KOH followed by chromatography, or other methods know in the art. Metals, such as antimony, cobalt and titanium, can be determined by digestion of the resin in a nitric acid/hydrofluoric acid mixture followed by Inductively Coupled Plasma (ICP) spectroscopy.

TABLE 3

PET Properties

| Property | Units | High IV PET | Low IV PET |
| --- | --- | --- | --- |
| Intrinsic Viscosity (IV) | dl/g | 0.83 | 0.56 |
| Molecular Weight (Mw) | Daltons | 92,400 | 56,200 |
| Polydispersity (PDI) | | 3.1 | 2.7 |
| Tg | ° C. | 83.2 | 82.5 |
| Tm | ° C. | 242 | 257 |
| Diethylene Glycol (DEG) | Wt % | 0.8 | 0.8 |
| Acid end groups (COOH) | Meq/Kg | 20 | 23 |
| Metals Content | | | |
| Antimony | Ppm | 220 | 16 |
| Cobalt | Ppm | 72 | 9 |
| Phosphorus | Ppm | 69 | 49 |
| Titanium | Ppm | 0.2 | Not detected |

Examples 1-8 and Comparative Examples A-E

The purpose of Examples 1-8 and Comparative Examples A-E was to evaluate the transparency and physical properties of compositions containing at least one polyethylene terephthalate resin having (i) a diethylene content ranging from 0.1 to 4 weight %, (ii) an intrinsic viscosity (IV) that is more than 0 and less than 0.83 dl/g, and (iii) carboxylic acid end groups in an amount from 10 to 150 meq/Kg in different contexts.

Examples 1-4 and Comparative Examples A-C

The purpose of Examples 1-2 and Comparative Examples A and B was to compare the performance of polymer compositions containing from 40 to 60 wt % of at least one polyethylene terephthalate resin having (i) a diethylene content ranging from 0.1 to 4 weight %, (ii) an intrinsic viscosity (IV) that is more than 0 and less than 0.83 dl/g ("referred to here as "low IV" PET) (iii) and carboxylic acid end groups ranging from 10 to 150 meq/Kg, with compositions that used PET having a relatively higher IV.

The compositions with the components shown in Tables 2 and 3 were made with the preparation techniques described above. Although the compositions did not contain stabilizers, stabilizers could have been added in several amounts, e.g., from 0 pbw to 1 pbw, based on 100 pbw of the polymer composition of a stabilizer selected from phenol-containing stabilizers, phosphorus-containing stabilizers, or a combination thereof. The compositions were tested for their transparency properties in accordance to the testing techniques described above. The mechanical properties of the low IV PET-PEI blends were also measured on injection molded samples using various ASTM methods as described above.

The results of the evaluation of the blends of PEI with 40 to 50 wt % PET are shown in Tables 4 and 5.

TABLE 4

Transparency of PET-PEI Blends

| | A (Comparative) | 1 | B (Comparative) | 2 |
| --- | --- | --- | --- | --- |
| Components | | | | |
| PEI | 60 | 60 | 50 | 50 |
| High IV PET | 40 | 0 | 50 | 0 |
| Low IV PET | 0 | 40 | 0 | 50 |
| Properties | | | | |
| BPA Level (ppm) | <1 | <1 | <1 | <1 |
| Tg (deg C.) | 158 | 159 | 147 | 146 |
| Transmission (T %) | 71 | 73 | 62 | 75 |
| Yellowness Index (YI) | 61 | 64 | 59 | 61 |
| Haze (H %) | 4.9 | 2.4 | 25.0 | 2.8 |
| Appearance | Cloudy/Hazy | Transparent | Opaque | Transparent |

The results in Table 4 show that use of the low IV PET (the PET that had (i) a diethylene content from 0.1 to 4 weight %, (ii) an intrinsic viscosity (IV) that is more than 0 and less than 0.83 dl/g, and (iii) carboxylic acid end groups from 10 to 150 meq/Kg) in Examples 1 and 2 exhibited a surprising low haze (% H<4.5%) with an improvement in transparency (% T>71%) compared to the high IV PET-PEI blends, in Examples A and B, which ranged from cloudy to opaque in appearance.

The clear blends of Examples 1 and 2 also had no measurable bisphenol A (BPA) by extraction in accordance with migration protocols established by the U.S. Food and Drug Administration (FDA).

Examples 1 and 2 also had a single, high glass transition temperature from 146 to 159° C. as determined by differential scanning calorimetry (DSC) with a 20° C./min. heating rate.

Table 5 shows the mechanical properties of samples molded from Comparative Example B and the low haze IV PET-PEI blends tested in Examples 1 and 2.

TABLE 5

Mechanical Properties of PET-PEI Blends

| | Units | C (Comparative) | 3 | 4 |
|---|---|---|---|---|
| Components | | | | |
| PEI | | 60 | 60 | 50 |
| High IV PET | | 40 | 0 | 0 |
| Low IV PET | | 0 | 40 | 50 |
| Properties | | | | |
| Tensile Yield Strength | MPa | 99 | 98 | 93 |
| Tensile Modulus | MPa | 3550 | 3520 | 3390 |
| Flexural Strength | MPa | 160 | 159 | 151 |
| Flexural Modulus | MPa | 3240 | 3230 | 3160 |
| HDT (66 psi) | °C. | 132 | 135 | 123 |
| HDT (264 psi) | °C. | 124 | 124 | 113 |
| Un-notched Izod | J/m | 1080 | 1340 | 1350 |
| Reversed Notched Izod | J/m | 957 | 903 | 1220 |
| Melt Flow Rate (295° C./1.2 kgf) | g/10 min | 6.7 | 8.6 | 14.6 |
| Specific Gravity | | 1.31 | 1.31 | 1.31 |

The results in Table 5 show that the compositions containing the low IV PET exhibited surprisingly high tensile modulus (>3,300 MPa) as well as high tensile strength (>93 MPa). Advantageously, highly useful and beneficial flexural properties were also achieved, notably a flexural modulus that was greater than 3,100 MPa and flexural strength that was greater than 150 MPa.

Examples 3 and 4 also show improved melt flow rate at 295° C. over the control Example C. Even with 50% PET, Example 4 still has a 264 psi heat deflection under load of over 110° C.

Examples 5-6 and Comparative Examples D-E

The purpose of Examples 5-6 and Comparative Examples D-E was to evaluate the transparency and physical properties of compositions in which 0.2 wt % sodium stearate (NaSt) was used. More particularly, the low haze 60:40 and 50:50 blends made using low IV PET with PEI were further combined with 0.2 wt % sodium stearate as shown in Table 6, using the preparation techniques described above. Although the compositions did not contain stabilizers, stabilizers can be added in several amounts, e.g., from 0 pbw to 1 pbw, based on 100 pbw of the polymer composition of a stabilizer selected from phenol-containing stabilizers, phosphorus-containing stabilizers, or a combination thereof. The compositions were tested in accordance to the testing procedures described above.

Table 6 shows the transparency results that were obtained for the samples containing the compositions after autoclave exposure.

TABLE 6

Autoclave Exposure

| | 5 | D (Comparative) | 6 | E (Comparative) |
|---|---|---|---|---|
| Property | 60:40 PEI:Low IV PET | 60:40 PEI:Low IV PET + 0.2 wt. % NaSt | 50:50 PEI:Low IV PET | 50:50 PEI:Low IV PET + 0.2 NaSt |
| % T (as molded) | 76.4 | 73.3 | 76.8 | 75.4 |
| % T (7 hr, 110° C.) | 76.4 | 64.6 | 76.9 | 63.8 |
| % H (as molded) | 3.1 | 3.2 | 3.2 | 3.0 |
| % H (7 h, 110° C.) | 3.2 | 10.3 | 3.8 | 12.4 |

The results in Table 6 show that the samples as molded were all clear. However, when subjected to 110° C. steam in an autoclave for only 7 hours, Examples D and E (with sodium stearate) showed a higher degree of haze than Examples 5 and 6 (no sodium stearate). This retention of clarity and low haze (less than 5%) is a very desirable feature for articles for food service or medical applications that will expose the molded articles to repeated steam sterilization.

Examples 7 and 8

The purpose of these Examples was to evaluate the performance of the transparent, high PET content PEI compositions compared with alkyl amide mold release agents. Compositions containing a 60:40 PEI:PET blend with and without 0.3 wt % erucamide were prepared in accordance to the preparation techniques described above. Although the compositions did not contain stabilizers, stabilizers could have been added in several amounts, e.g., from 0 pbw to 1 pbw, based on 100 pbw of the polymer composition of a stabilizer selected from phenol-containing stabilizers, phosphorus-containing stabilizers, or a combination thereof.

Molded samples containing the compositions were tested for transparency and physical properties in accordance to the techniques described above. Table 7 shows the results.

TABLE 7

| Example No. | | 7 | 8 |
|---|---|---|---|
| Composition | | 60:40 PEI:PET | 60:40:0.3 PEI:PET:Erucamide |
| Appearance | | Clear | Clear |
| MVR (295° C./6 min/6.7 Kg) | | 66 | 71 |
| MVR (295° C./18 min/6.7 Kg) | | 69 | 75 |
| MVR (295° C./6 min/1.2 Kg) | | 12.1 | 12.1 |
| Tg (by DMA) | °C. | 156.4 | 154.1 |
| HDT (264 psi) | °C. | 121.8 | 120.4 |
| Tensile Modulus at 23° C. | MPa | 3790 | 3810 |
| Flex Modulus (by DMA at 50° C.) | MPa | 2091 | 2456 |
| Flex Modulus (by DMA at 75° C.) | MPa | 2008 | 2316 |
| Flex Modulus (by DMA at 100° C.) | MPa | 1946 | 2204 |
| Flex Modulus (by DMA at 125° C.) | MPa | 1698 | 1740 |
| Reversed Notched Izod at 23° C. | J/m | 358 | 361 |
| YI (3.2 mm, as molded) | | 61.7 | 65.3 |
| % T (3.2 mm, as molded) | | 69.6 | 68.4 |
| % H (3.2 mm, as molded) | | 9.0 | 7.5 |
| YI (3.2 mm, after 24 h, 110° C.) | | 59.5 | 61.0 |
| % T (3.2 mm, after 24 h, 110° C.) | | 72.1 | 71.7 |
| % H (3.2 mm, after 24 h, 110° C.) | | 9.0 | 7.1 |

The results in Table 7 show that the samples retained of clarity (>60% transmission at 3.2 mm) even with the alkyl amide release agent, as well as % T and low (<10%) haze after 24 exposure to steam at 110° C. The erucamide appears to have a beneficial effect on improving the flexural and tensile modulus. Good melt stability was evidenced by the small change in MVR (melt volume ratio) after 6 and 18 minutes at 295° C.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A thermoplastic polymer composition, comprising a bisphenol A free combination of:
   (a) from 40 to 60 pbw, based on 100 pbw of the polymer composition, of a polyimide selected from the group consisting of polyetherimides, polyetherimide sulfones, and combinations thereof, the polyimide having a weight average molecular weight ranging from 5,000 to 80,000 Daltons;
   (b) from 40 to 60 pbw, based on 100 pbw of the polymer composition, of a polyethylene terephthalate, the polyethylene terephthalate having
      (i) a diethylene glycol content ranging from 0.1 to 4 wt %, based on the weight of the polyethylene terephthalate,
      (ii) an intrinsic viscosity that is more than 0 and less than 0.60 dl/g, and
      (iii) carboxylic acid end groups in an amount ranging from 10 to 150 meq/Kg;
   (c) from 0 pbw to 1 pbw, based on 100 pbw of the polymer composition of a stabilizer selected from phenol-containing stabilizers, phosphorus-containing stabilizers, or a combination thereof;
   (d) from 10 to 300 ppm, based on the weight of the polyethylene terephthalate, of antimony;
   (e) from 0 to 300 ppm, based on the weight of the polyethylene terephthalate, of cobalt;
   (f) from 0 to 300 ppm, based on the weight of the polyethylene terephthalate, of titanium; and
   (g) less than 10 ppm of extractable bisphenol A as determined in accordance with migration protocols described in "Guidance for Industry: Preparation of Premarket Submissions for Food Contact Substances: Chemistry Recommendations" U.S. Department of Health and Human Services, Food and Drug Administration, Center for Food Safety and Applied Nutrition: April 2002; December 2007.

2. The polymer composition of claim 1, wherein the polyimide is a polyetherimide of formula

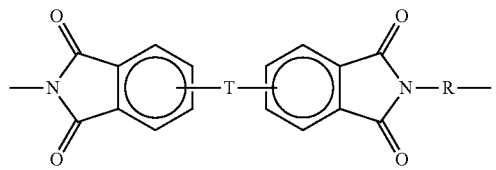

wherein
T is —O— or a group of the formula —O—Z—O— wherein the divalent bonds of the —O— or the —O—Z—O— group are in the 3,3', 3,4', 4,3', or the 4,4' positions and Z is a divalent radical selected from the group consisting of formulae

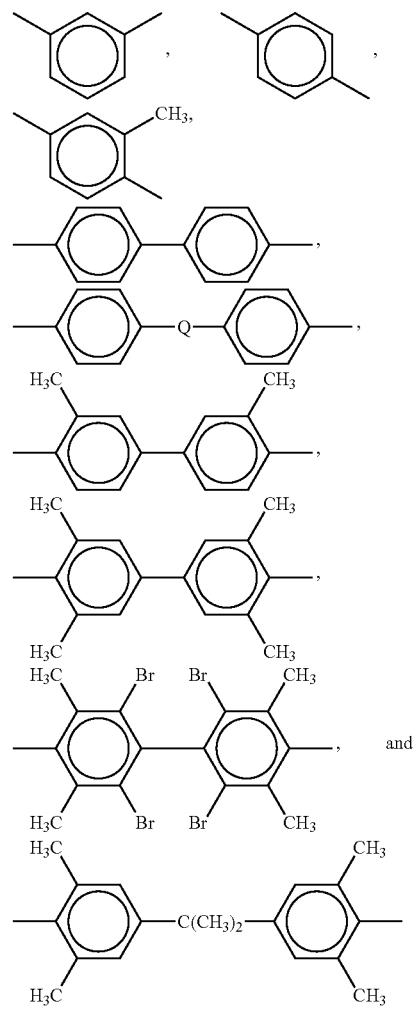

wherein Q is —O—, —S—, —C(O)—, —SO$_2$—, —SO—, or —C$_y$H$_{2y}$— wherein y is an integer from 1 to 5; and R is a divalent group of formula

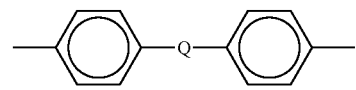

wherein Q is —O—, —S—, —C(O)—, —SO$_2$—, —SO—, or —C$_y$H$_{2y}$— wherein y is an integer from 1 to 5.

3. The polymer composition of claim 2, wherein the polyetherimide has a bromine or chlorine content of each less than 1000 ppm.

4. The polymer composition of any of claims 2-3, wherein the polyetherimide has a benzylic proton content of less than 100 ppm, as determined by proton nuclear magnetic resonance spectroscopy.

5. The polymer composition of claim 2, wherein the polyetherimide is the reaction product of a polymerization of 2,2-bis[4-(3,4-dicarboxyphenoxy)phenyl]propane dianhydride with meta-phenylene diamine.

6. The polymer composition of claim 5, wherein the polyetherimide has a content of 0 to 500 ppm of each of 1,3-bis (N-(4-chlorophthalimido))benzene, 1,3-bis(N-phthalimido) benzene, meta-phenylene diamine, and bis(phthalimide).

7. The polymer composition of claim 1, wherein the polyethylene terephthalate has from more than 0 to 100 ppm, based on the weight of the polyethylene terephthalate, of cobalt; and no detectable titanium.

8. The polymer composition of claim 1, wherein the polyethylene terephthalate has a cyclohexane dimethanol unit content of less than 1 weight percent and an isophthalic acid unit content of less than 5 weight percent.

9. The polymer composition of claim 1, wherein the polyethylene terephthalate has less than 3 wt. % of cyclic polyester.

10. The polymer composition of claim 1, wherein the polyethylene terephthalate is derived from a recycled polyethylene terephthalate.

11. The polymer composition of claim 1, wherein the polyethylene terephthalate has melt temperature ranging from 240° C. to 260° C.

12. The polymer composition of claim 1, having a transparency that is more than 60%, and haze that is less than 10%, as measured on a molded 3.2 mm thick sample in accordance with ASTM D1003.

13. The polymer composition of claim 1, having a melt flow rate of from 1 to 100 cc/mm, determined on dried pellets in accordance with ASTM D1238 at 295° C. using a 1.2 Kg weight.

14. The polymer composition of claim 1, having a tensile modulus of greater than 3,000 MPa and a tensile strength of greater than 50 MPa as measured on a molded 3.2 mm type I bar in accordance with ASTM D638 with a crosshead speed of 50 mm/min.

15. The polymer composition of claim 1, having a flexural modulus of greater than 3,000 MPa and a flexural strength of greater than 100 MPa as measured on a molded 3.2 mm bar in accordance with ASTM method D790.

16. The polymer composition of claim 1, wherein the polymer composition has a content of 0 ppm of each of lead, mercury, cadmium, thallium, and arsenic.

17. The polymer composition of claim 1, wherein the composition has a single glass transition temperature ranging from 110° C. to 170° C.

18. The polymer composition of claim 1 further comprising an alkyl amide mold release agent selected from

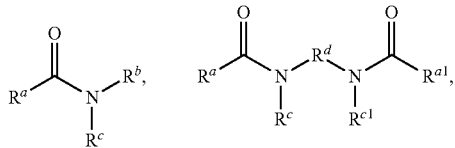

or a combination thereof, wherein $R^a$ and $R^{a1}$ are each independently a $C_1$ to $C_{36}$ alkyl group; $R^b$, $R^c$, and $R^{c1}$ are each independently H or a $C_1$ to $C_{30}$ alkyl group; and $R^d$ is a $C_2$ to $C_6$ alkyl group.

19. The polymer composition of claim 18 wherein the alkyl amide mold release agent has a molecular weight from about 300 to about 700.

20. The polymer composition of claim 1 wherein the alkyl amide mold release agent is selected from the group consisting of a primary amide wherein $R^b$ an $R^c$ are each hydrogen, a $C_1$ to $C_6$ N-alkyl amide wherein $R^b$ is hydrogen and $R^c$ is a $C_1$ to $C_6$ alkyl group, secondary amides of linear or branched $C_{12-36}$ alkyl carboxylic acids, erucic acid, stearic acid, oleic acid, linoleic acid, linolenic acid, myristic acid, palmitic acid, arachidonic acid, behenic acid, and lignoceric acid, $C_{6-20}$ bisamides of $C_{2-6}$ alkylene diamines, or a combination of any of the foregoing.

21. The polymer composition of claim 1 wherein the polyimide polyethylene terephthalate blend has less than 100 ppm of an alkaline metal carboxylic acid salt.

22. The polymer composition of claim 21 wherein a molded sample of the composition has a transparency that is more than 60%, and haze that is less than 10%, measured on a 2.3 mm thick molded sample in accordance with ASTM D1003, after 7 hours of exposure to steam at 110° C.

23. An article comprising the thermoplastic polymer composition claim 1.

24. The article of claim 23, wherein the article is a container having a wall thickness from 1.0 to 10.0 mm and an internal volume of from 10 to 10,000 cc.

25. A method of manufacture of the article of claim 23, comprising:
(a) melting the composition of claim 1 at a temperature ranging from 250° C. to 350° C., wherein the composition has a melt viscosity at 295° C. from 10 to 100 cc/mm;
(b) placing the melted composition in a three-dimensional mold to mold the composition; and
(c) cooling the molded composition to at least below the glass transition temperature of the composition, to form the article; and
(d) removing the article from the mold.

26. A thermoplastic polymer composition, comprising:
(a) from 40 to 60 pbw of a polyetherimide that is the reaction product of a polymerization of 2,2-bis[4-(3,4-dicarboxyphenoxy)phenyl]propane dianhydride with meta-phenylene diamine, wherein the polyetherimide has
(i) a weight average molecular weight ranging from 5,000 to 8,0000 Daltons;
(ii) a halogen content that is less than 1000 ppm, and
(iii) less than 100 ppm benzylic protons as measured by proton nuclear magnetic spectroscopy;
(b) from 40 to 60 pbw of at least one polyethylene terephthalate resin having
(i) a diethylene glycol content ranging from 0.1 to 4 wt %,
(ii) an intrinsic viscosity that is more than 0 and less than 0.60 dl/g, and
(iii) carboxylic acid end groups ranging from 10 to 150 meq/Kg; and
(c) from 0 pbw to 1 pbw stabilizer to said stabilizer is a phenol-containing or phosphorus-containing stabilizer or a mixture thereof;
(d) an antimony component ranging from 10 to 300 ppm, based on the weight of the polyethylene terephthalate;
(e) from 0 to 300 ppm cobalt;
wherein the composition has
(i) a transparency that is more than 60% at 3.2 mm, and haze that is less than 10%, per as measured on a molded 3.2 mm thick sample in accordance with ASTM D790,
(ii) a single glass transition temperature ranging from 110 to 170° C.,
(iii) a melt flow rate of from 10 to 100 cc/mm, determined on dried pellets in accordance with ASTM D1238 at 295° C. using a 1.2 Kg weight;
wherein the composition is bisphenol A free.

27. An article comprising the composition of claim 26.

28. The article of claim 27, wherein the article is a container having a wall thickness from 1.0 to 10.0 mm and an internal volume of from 10 to 10,000 cc.

* * * * *